(No Model.) 2 Sheets—Sheet 1.

J. C. HENRY.
REGULATOR FOR ELECTRIC MACHINES.

No. 499,544. Patented June 13, 1893.

Witnesses
Wm. H. Courtland
A. G. Orne

Inventor
John C. Henry
By Bentley & Blodgett
Attys.

(No Model.) 2 Sheets—Sheet 2.
J. C. HENRY.
REGULATOR FOR ELECTRIC MACHINES.
No. 499,544. Patented June 13, 1893.
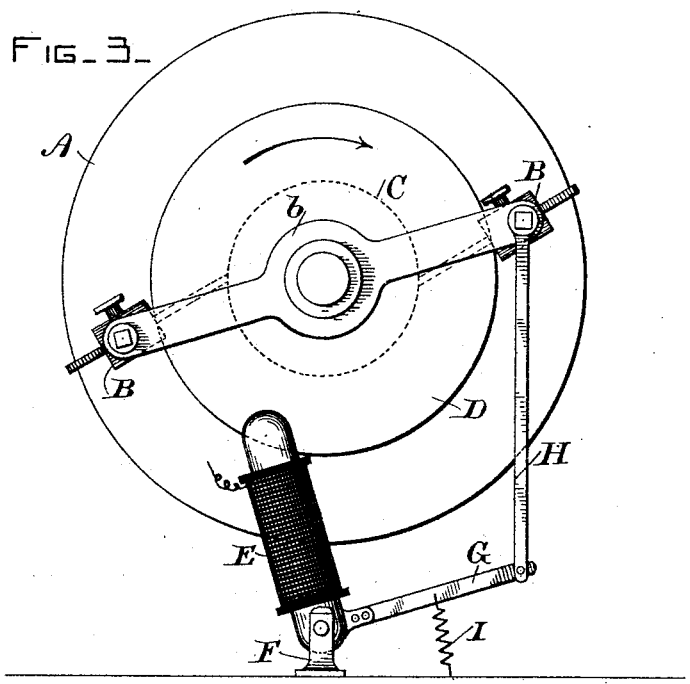
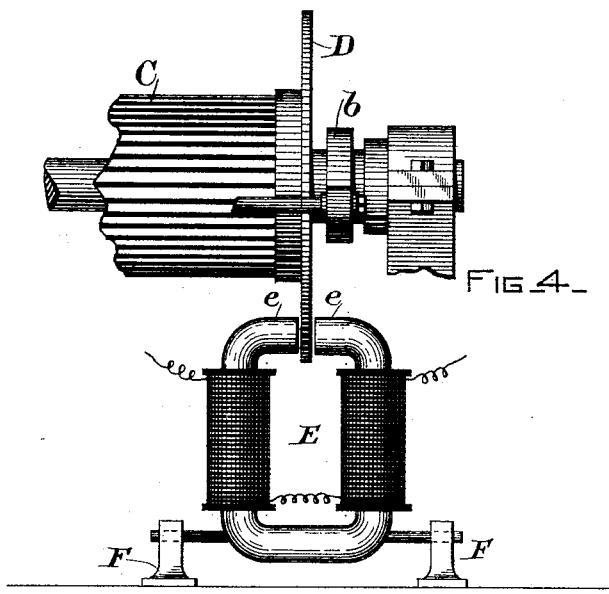
Witnesses
W. H. Courtland
A. C. Crue
Inventor
John C. Henry.
By Buckley & Blodgett
Attys

UNITED STATES PATENT OFFICE.

JOHN C. HENRY, OF WESTFIELD, NEW JERSEY.

REGULATOR FOR ELECTRIC MACHINES.

SPECIFICATION forming part of Letters Patent No. 499,544, dated June 13, 1893.

Application filed September 3, 1892. Serial No. 444,966. (No model.)

*To all whom it may concern:*

Be it known that I, JOHN C. HENRY, a citizen of the United States, residing at Westfield, county of Union, State of New Jersey, have invented a certain new and useful Improvement in Regulators for Electric Machines, of which the following is a specification.

This invention relates to improvements in automatic regulators for dynamo electric machines, and is more particularly intended for use on constant current motors. It is of that class wherein the diameter of commutation is changed by the speed and the counter electro-motive force, the object of my invention being to maintain the speed reasonably constant, the electric energy absorbed being proportioned to the work being done. This result is accomplished by a novel device for shifting the brushes which is controlled automatically by the speed of the armatures and by its back electro motive-force which on constant current motors is a measure of the energy absorbed.

Figure 1:
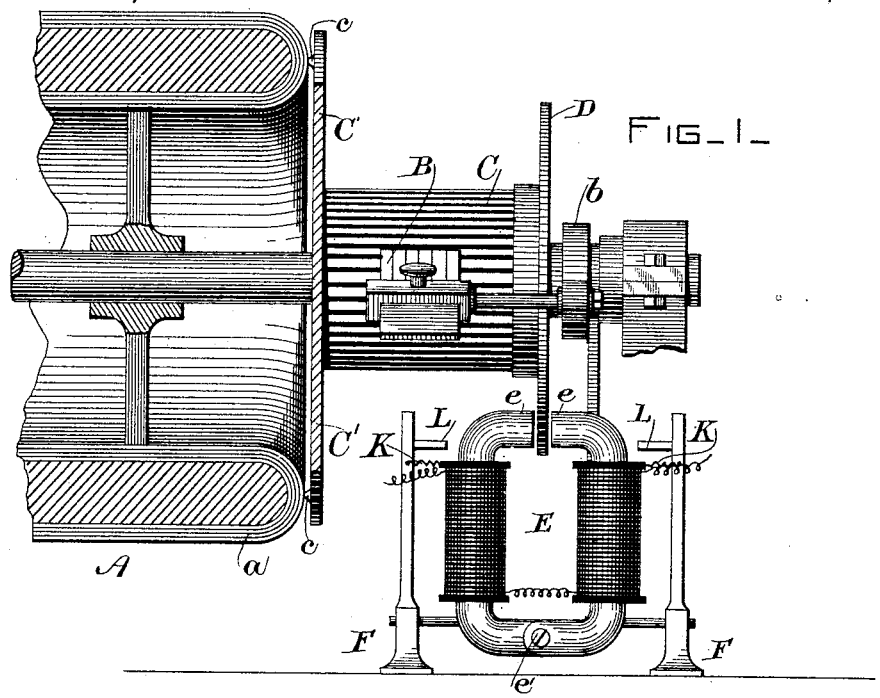
Figure 2:
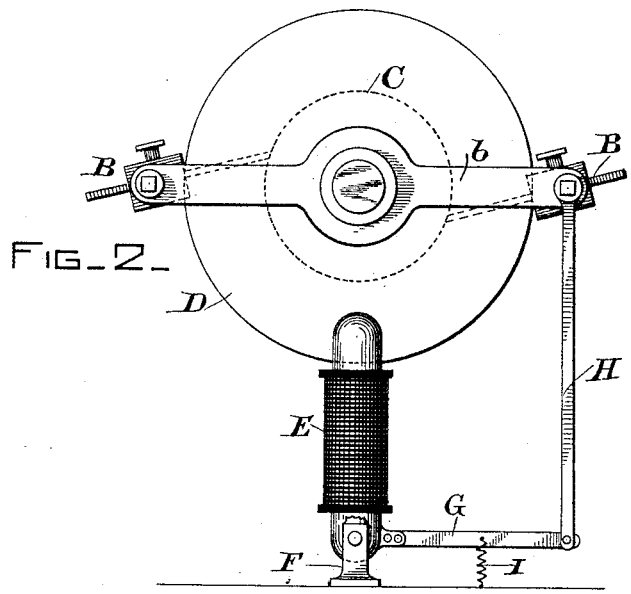

In the drawings, Figure 1 is a side elevation of my regulator, the armature being shown in section. Fig. 2 is an end view, when the motor is at rest. Fig. 3 is a similar view, when the motor is running, and Fig. 4 is a side view of a modification.

The armature A, its brushes B, and commutator C may be of any ordinary form. The armature shown is wound with flat wire $a$, and the commutator bars C' carry sharp points $c$, which embed themselves in the wire and so make superficial contact therewith at the proper points. The brush yoke $b$ is free to turn around the shaft to change the position of the brushes. Secured upon the shaft is a disk D of diamagnetic metal, such as copper. Below the disk is arranged an electro-magnet E, hinged at its lower end to stationary supports F and having preferably two polar projections $e$ embracing the edge of the disk D. When used with a constant current motor the magnet coils are placed in shunt with the armature or the motor terminals, preferably the former. When used on a regulator for generators, the magnet coils are preferably in series with the armature. Rigidly secured to the magnet is an arm G, the extremity of which is connected by a link H with the yoke $b$. A spring I tends to hold the arm normally in a horizontal position as shown in Fig. 2.

When the motor is started and the copper disk is rotated, the resistance which the copper offers to the magnetic lines of force passing between the poles $e$ tends to drag the magnet along with the disk, which results in tilting the magnet to one side and thereby rocking the yoke $b$, as shown in Fig. 3. The angular movement of the magnet and yoke depends upon the speed of the armature, the strength of the magnet, the proximity of its poles to the diamagnetic disk, and the area of the intercepted magnetic field.

The poles may be arranged at a fixed distance from the disk, as in Fig. 4, or they may be adjustable either manually or automatically. In Fig. 1 the magnet is shown as made in two parts hinged together at $e'$, so that the poles $e$ can be moved toward or away from the disk. When a normal current is passing the cores are held back by springs K against fixed stops L. With an increase in speed, the electro-motive force increases, and the poles $e$ attract each other and approach the disk.

Various modifications may be made without departing from the spirit of my invention. For instance, the disk may be mounted on a separate shaft, geared to the armature shaft. The magnet may be single, and have but one pole adjacent to the disk. The spring I may be adjustable, to vary the tension, or its point of connection with the arm. The link H may be adjustable in length.

What I claim as new, and desire to secure by Letters Patent, is—

1. An automatic regulator for a constant current dynamo electrical machine having a movable brush holder, comprising a disk of diamagnetic metal rotating with the armature shaft, a movable electro-magnet in circuit with the armature and having a polar projection in proximity to said disk, and connections between said magnet and the movable brush holder, substantially as described.

2. The combination with a dynamo electric machine having a movable brush holder, of a disk of diamagnetic metal rotating with the armature shaft, a tilting electro-magnet in circuit with the armature, and having a polar projection in proximity, to said disk, and connections between said magnet and the brush holder, substantially as set forth.

3. The combination with a dynamo electric machine having a movable brush holder, of a disk of diamagnetic metal rotating with the armature shaft, a U-shaped electro-magnet having its poles embracing the edge of the disk, and hinged at its lower end, and an arm rigidly attached to said magnet and connected with the brush holder, substantially as set forth.

4. The combination with a dynamo electric machine having a movable brush holder, of a disk of diamagnetic metal rotating with the armature shaft, an electro-magnet having a polar projection arranged in proximity to said disk, and movable toward and away from said disk, and connections between said magnet and the brush holder, substantially as set forth.

5. The combination with a dynamo electric machine having a movable brush holder, of a disk of diamagnetic metal rotating with the armature shaft, an electro-magnet movable toward and away from said disk, a spring holding said magnet normally away from the disk, and connections between the magnet and the brush holder, substantially as set forth.

6. The combination with a dynamo electric machine having a movable brush holder, of a disk of diamagnetic metal rotating with the armature shaft, a tilting U-shaped electro-magnet comprising two cores hinged together and having their poles on opposite sides of said disk, springs for holding said poles away from the disk, stops to limit the movement of said poles, and connections between the magnet and the brush holder, substantially as described.

In witness whereof I have hereto set my hand this 27th day of August, 1892.

JOHN C. HENRY.

Witnesses:
JOHN M. C. MARSH,
WM. W. GILBY.